United States Patent
Sato

[11] Patent Number: 6,118,920
[45] Date of Patent: *Sep. 12, 2000

[54] IMAGE SIGNAL RECORDING DEVICE

[75] Inventor: Koichi Sato, Saitama, Japan

[73] Assignee: Asahi Kogaku Kogyo Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 09/058,144

[22] Filed: Apr. 10, 1998

[30] Foreign Application Priority Data

Apr. 10, 1997 [JP] Japan .................................. 9-108154

[51] Int. Cl.⁷ .............................. H04N 5/76; H04N 5/782
[52] U.S. Cl. ................................................ 386/46; 386/52
[58] Field of Search ........................... 386/46, 83, 109, 386/52, 1, 27, 113, 95; 360/32

[56] References Cited

U.S. PATENT DOCUMENTS 5,049,911  9/1991  Shimizu .
5,452,022  9/1995  Yamamoto et al. .
5,517,321  5/1996  Yoshida ..................................... 386/83

FOREIGN PATENT DOCUMENTS 2231881  9/1990  European Pat. Off. .

*Primary Examiner*—Robert Chevalier
*Attorney, Agent, or Firm*—Greenblum & Bernstein, P.L.C.

[57] ABSTRACT

An image signal recording device comprises a remaining amount detecting processor which detects a remaining amount of a memory card, which is recordable. When the remaining amount is greater than a recording capacity, which is necessary for recording an image signal corresponding to a single image, the image signal is recorded in the memory card. When the remaining amount is less than the recording capacity, an image area, which is included in the image and can be recorded in the memory card, is indicated on a surface of a display device. A compression ratio is inputted, if necessary, so that a compressed image signal, corresponding to the image area, is recorded in the memory card.

13 Claims, 5 Drawing Sheets

IMAGE SIGNAL RECORDING DEVICE

BACKGROUND OF THE INVENTION

1. Field of the Invention

The present invention relates to an image signal recording device by which an image signal corresponding to a single image is recorded in a recording medium.

2. Description of the Related Art

Conventionally, there is known an image signal recording device, in which a remaining amount of a recording medium is determined prior to a recording operation of an image signal in the recording medium. In this image signal recording device, the recording operation is prohibited when the remaining amount of storage area on the recording medium is less than the recording capacity necessary to record the whole of the image signal corresponding to a single image.

Therefore, a problem concerning the image signal recording device arises, in which a recording area of the recording medium is useless, and thus the usage efficiency of the recording medium is insufficient.

SUMMARY OF THE INVENTION

Therefore, an object of the invention is to provide an image signal recording device by which an image signal can be recorded in a recording medium, even when a recordable area of the recording medium becomes small, so that the usage efficiency of the recording medium is improved.

According to the present invention, there is provided an image signal recording device comprising a remaining amount detecting processor, detecting a remaining amount of a recording medium, which is recordable, and a recording processor.

The recording processor can record at least a part of a single image in the recording medium, when the remaining amount is less than a recording capacity, which is necessary to record an image signal corresponding to the single image.

Further, according to the present invention, there is provided an image signal recording device comprising a remaining amount detecting processor, a compression ratio setting processor and a recording processor.

The remaining amount detecting processor detects a remaining amount of a recording medium, which is recordable. The compression ratio setting processor sets a compression ratio of an image signal, which is to be recorded in the recording medium. The recording processor can record a part of each of (N+α) number of images, N and α being positive integers, in the recording medium, when the remaining amount is less than a recording capacity necessary to record image signals, which correspond to N number of images and are compressed in accordance with the compression ratio.

BRIEF DESCRIPTION OF THE DRAWINGS

The present invention will be better understood from the description of the preferred embodiments of the invention set forth below, together with the accompanying drawings, in which.

DESCRIPTION OF THE PREFERRED EMBODIMENTS

Figure 1:
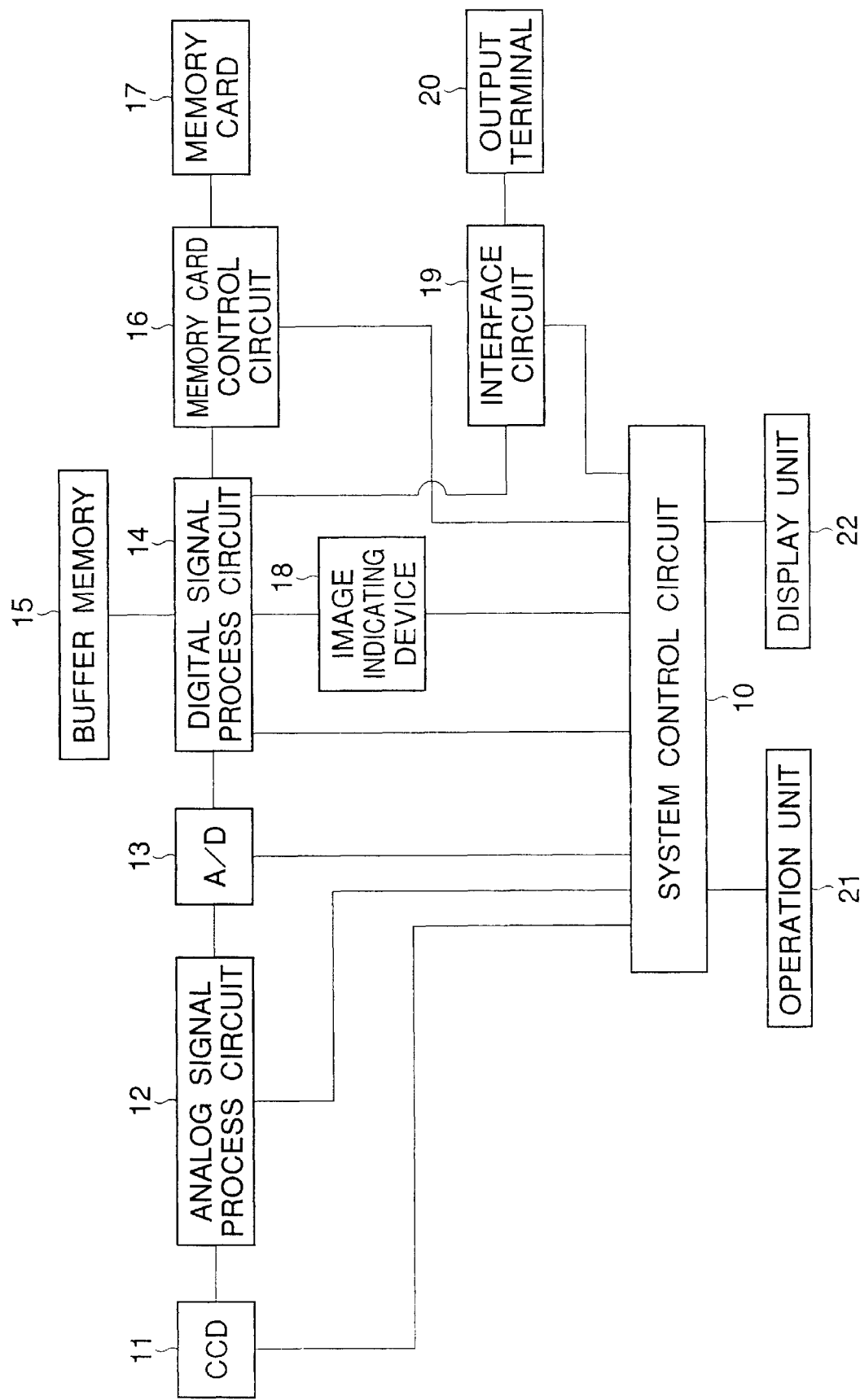
FIG. 1 is a block diagram of an image signal recording device of an embodiment of the present invention.

The present invention will be described below with reference to embodiments shown in the drawings.

FIG. 1 shows a block diagram of an image signal recording device of an embodiment of the present invention. The image signal recording device is provided in an electronic still camera.

The image signal recording device is controlled by a system control circuit 10, provided with a microcomputer. An imaging device (charge-coupled device (CCD)) 11, which is a solid-state imaging device, is disposed on an optical axis of a photographing optical system (not shown), so that an image obtained through the optical system is formed on a light receiving surface of the CCD 11. The CCD 11 is controlled by the system control circuit 10, so that an image signal corresponding to the image is outputted from the CCD 11. The image signal is subjected to a predetermined process, such as a correlated double sampling (CDS), in an analog signal process circuit 12, and is then converted from an analog signal to a digital signal by an A/D converter 13.

The digital image signal is temporarily stored in a buffer memory 15, through a digital signal process circuit 14. The digital image signal is read from the buffer memory 15, and inputted to the digital signal process circuit 14, in which the digital image signal is subjected to a predetermined process. The image signal, outputted from the digital signal process circuit 14, is converted into an image signal having a predetermined format in a memory card control circuit 16, and is recorded in a memory card 17. Note that an image compression operation, by which the image signal is compressed, is performed in the digital signal process circuit 14.

The image signal outputted from the digital signal process circuit 14 is transmitted to an image indicating device 18, provided with a liquid crystal display, for example, so that an image is indicated on the surface of the image indicating device 18. Further, the image signal, outputted from the digital signal process circuit 14, is converted by an interface circuit 19 to a signal which conforms to a standard of an external device connected to an output terminal 20, and is outputted to the external device through the output terminal 20.

An operation unit 21 and a display unit 22 are connected to the system control circuit 10. The operation unit 21 is provided with a selection switch for selecting a compression ratio of an image and an image area of the image, which are to be used when recording the image in the memory card 17. The display unit 22 is provided with a liquid crystal display for indicating a data, which, for example, implies an operation mode of the image signal recording device.

When the remaining amount of the memory-card 17, which is recordable, is insufficient to record an entire image signal, an image area of the image, an image signal of which can be recorded in the memory card 17, is indicated on the surface of the image indicating device 18. In the digital signal processing circuit 14, the image signal corresponding to the image area is extracted under control of the system control circuit 10, and thus the image signal is recorded in the memory card 17.

Figure 2:
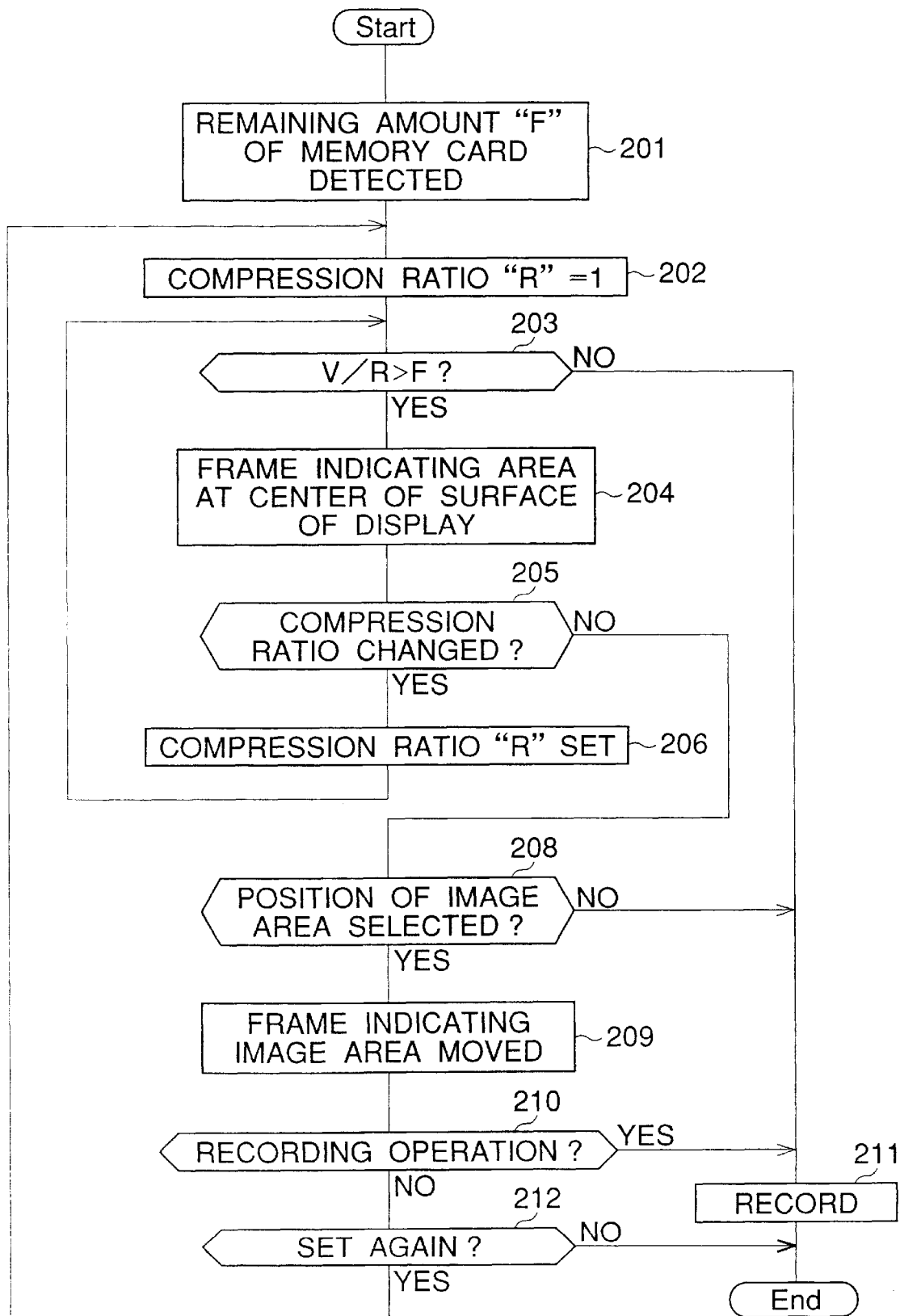
FIG. 2 is a first example of a flowchart of a program, by which an image signal is recorded in a memory card.

FIG. 2 is a first example of a flowchart of a program, by which an image signal is recorded in the memory card 17. This program is started when a record switch provided in the operation unit 21 is operated to set a record mode.

In Step 201, the remaining amount "F" of the memory card 17, which is recordable, is detected. In Step 202, the initial value of the compression ratio "R" is set to 1, which implies "non-compression". In Step 203, it is determined whether a compressed-image recording capacity "V/R", which is obtained by dividing the original recording capacity "V", necessary for recording an image signal corresponding to a single image, with the compression ratio "R", is greater than the remaining amount "F" of the memory card 17. When the compressed-image recording capacity "V/R" is less than or equal to the remaining amount "F", Step 211 is executed, in which the image signal is recorded in the memory card 17, using the compression ratio "R". Conversely, when the compressed-image recording capacity "V/R" is greater than the remaining amount "F", Step 204 and the following Steps are executed, enabling the image signal to be increasingly compressed and recorded in the memory card 17. Thus, this program ends.

Figure 5:
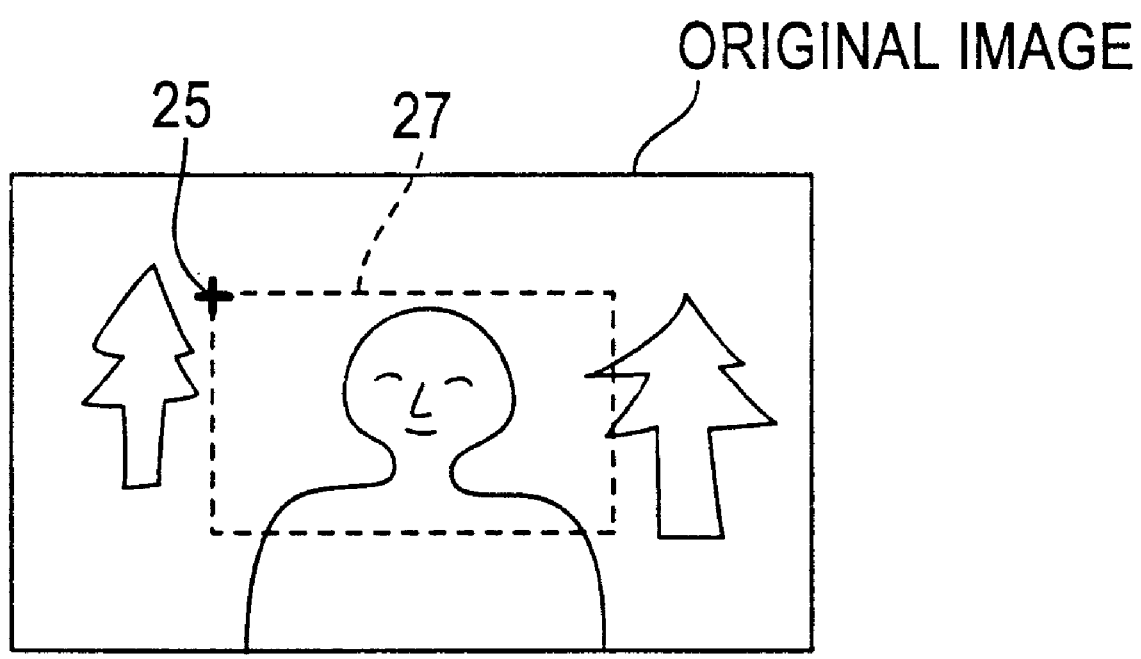
FIG. 5 is an illustration of the image indicating device and a frame indicating an area of an image which can be recorded in a remaining amount of the memory card, according to an aspect of the invention.

In Step 204, a frame indicating an area of the image, which can be recorded in the remaining amount "F" of the memory card 17, is indicated at the center portion of the surface of the image indicating device 18. FIG. 5 shows such a frame 27, which has the same aspect ratio as the original image. When the remaining amount "F" changes, the size of the frame correspondingly changes. In Step 205, it is determined whether the compression ratio "R" is to be changed. The alternation of the compression ratio "R" is performed by operating the selection switch provided in the operation unit 21. When the value of the compression ratio "R" is changed, the new compression ratio "R" is set in Step 206, and then the process returns to Step 203.

In Step 203, it is determined whether the compressed-image recording capacity "V/R", obtained by dividing the original recording capacity "V" using the compression ratio "R" set in Step 206, is greater than the remaining amount "F". When the compressed-image recording capacity "V/R" is less than or equal to the remaining amount "F", Step 211 is executed, in which the image signal is recorded in the memory card 17, using the compression ratio "R" set in Step 206. Conversely, when the compressed-image recording capacity "V/R" is greater than the remaining amount "F", Steps 204 through 206 are again executed.

While the loop composed of Steps 203 through 206 is executed, if it is determined in Step 205 that the compression ratio "R" should not be changed, based on the operation of the selection switch of the operation unit 21, Step 208 is executed, in which it is determined whether the position of the image area is to be selected. The image area is indicated on the surface of the image indicating device 18, by the execution of Step 204, and is the maximum area, corresponding to the maximum amount of the image signal, which can be recorded in the memory card 17. When a record start switch provided in the operation unit 21 is operated so that the image area is not to be changed, Step 211 is executed, in which the part of the image signal, corresponding to the image area, is recorded in the memory card 17, using the most recently set compression ratio "R". Conversely, when the image area is to be changed, Step 209 is executed, in which a cursor (shown as 25 in FIG. 5), for example, indicated on the surface of the image indicating device 18, is moved to set a new frame or new image area. When the frame is moved, the aspect ratio remains constant. The cursor 25 can be moved by operating an arrow key included in a keyboard provided in the operation unit 21. Namely, by operating the keyboard, the cursor is moved so that the frame is repositioned on the surface of the image indicating device 18 while retaining the aspect ratio.

In Step 210, it is determined whether a recording operation is to be carried out, i.e. whether the image signal, corresponding to the image area selected in Step 209, is to be recorded in the memory card 17. When the record start switch is operated, so that the recording operation is performed, the process goes to Step 211, and when the start switch is not operated, indicating the recording operation is unnecessary, the process goes to Step 212.

In Step 212, it is determined whether the image area is to be set again, based on an operation of a setting switch provided in the operation unit 21. When the image area is to be set again, the process returns to Step 202, so that the compression ratio "R" is reset to the initial value, and then the processes described above are re-executed. Conversely, if it is determined in Step 212 that the image area need not be set again, the recording operation is not carried out, and this program ends.

Note that an additional Step, in which it is determined whether Step 211 should be executed, may be provided between Steps 203 and 211. According to the additional Step, when Step 211 should be executed, the process goes to Step 211, and when Step 211 should not be executed, the process goes to Step 204.

As described above, according to the embodiment, when the remaining amount "F" of the memory card 17 is not large enough to record a single image, only a part of the image signal, which corresponds to the frame indicated in Step 204 or 208, is recorded in the memory card 17, with the image signal being compressed, if necessary. Therefore, even if the remaining amount "F" of the memory card 17 is insufficient to record the complete image signal, which is not compressed, the image signal can be recorded in the memory card 17 to some extent, whereby the usage efficiency of the memory card 17 is greatly improved.

Figure 3:
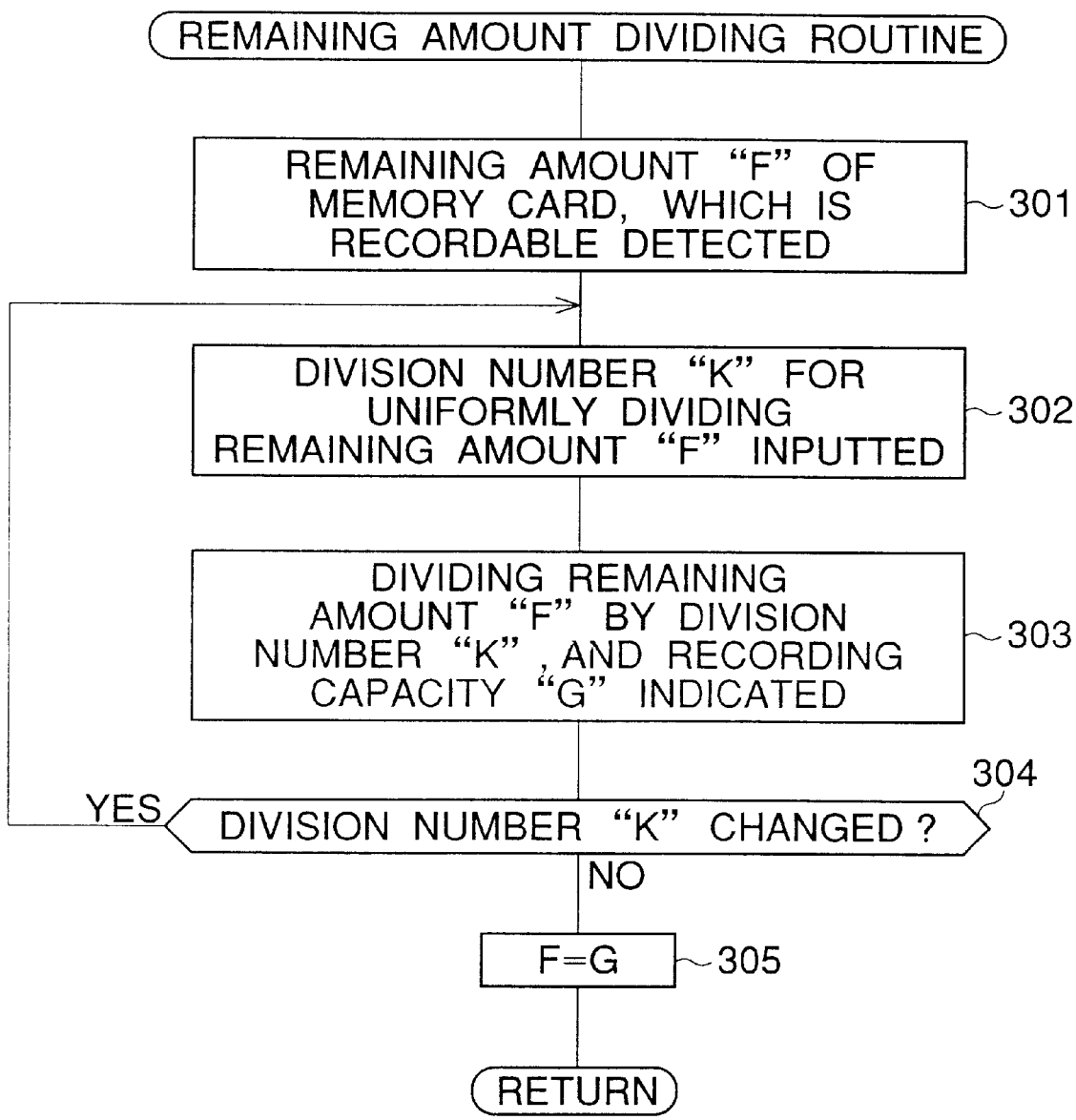
FIG. 3 is a flowchart of a subroutine, by which a remaining amount of the memory card is divided.

FIG. 3 is a flowchart of a subroutine by which the remaining amount "F" of the memory card 17 is divided. This subroutine can be executed in Step 201. In this case, the contents of Step 201 are changed to "Remaining amount dividing routine is executed."

In Step 301, the remaining amount "F" of the memory card 17, which is recordable, is detected, and is indicated on the surface of the image indicating device 18 or the display unit 22. In Step 302, a division number "K", by which the remaining amount "F" is uniformly divided, is inputted due to an operation of the switch provided in the operation unit 21. In Step 303, by dividing the remaining amount "F" by the division number "K", a recording capacity "G", assigned to a single image, is calculated and indicated on the surface of the image indicating device 18. In Step 304, it is determined whether the value of the division number "K" is to be changed, based on an operation of an alteration switch provided in the operation unit 21. When the division number "K" should be altered, the process returns to Step 302, and when the division number "K" is to remain unchanged, Step 305 is executed, in which the remaining amount "F" is replaced by the recording capacity "G", calculated in Step 303. Thus, this subroutine ends.

Accordingly, by executing the subroutine in Step 201 of the flowchart shown in FIG. 2, the remaining amount "F" of the memory card 17 is uniformly divided, so that a plurality of images can be recorded in a plurality of uniform recording areas of the memory card 17, respectively. Further, by executing Step 206 of the flowchart shown in FIG. 2, in association with the subroutine in Step 201, each of the image signals can be recorded in the memory card 17, while being optimumly compressed, so that the number of images, which are recordable, can be increased. Furthermore, by executing Step 209 of the flowchart shown in FIG. 2, an arbitrary image area, included in a single image, can be recorded in the memory card 17, enabling an unnecessary part of the image to be omitted.

Figure 4:
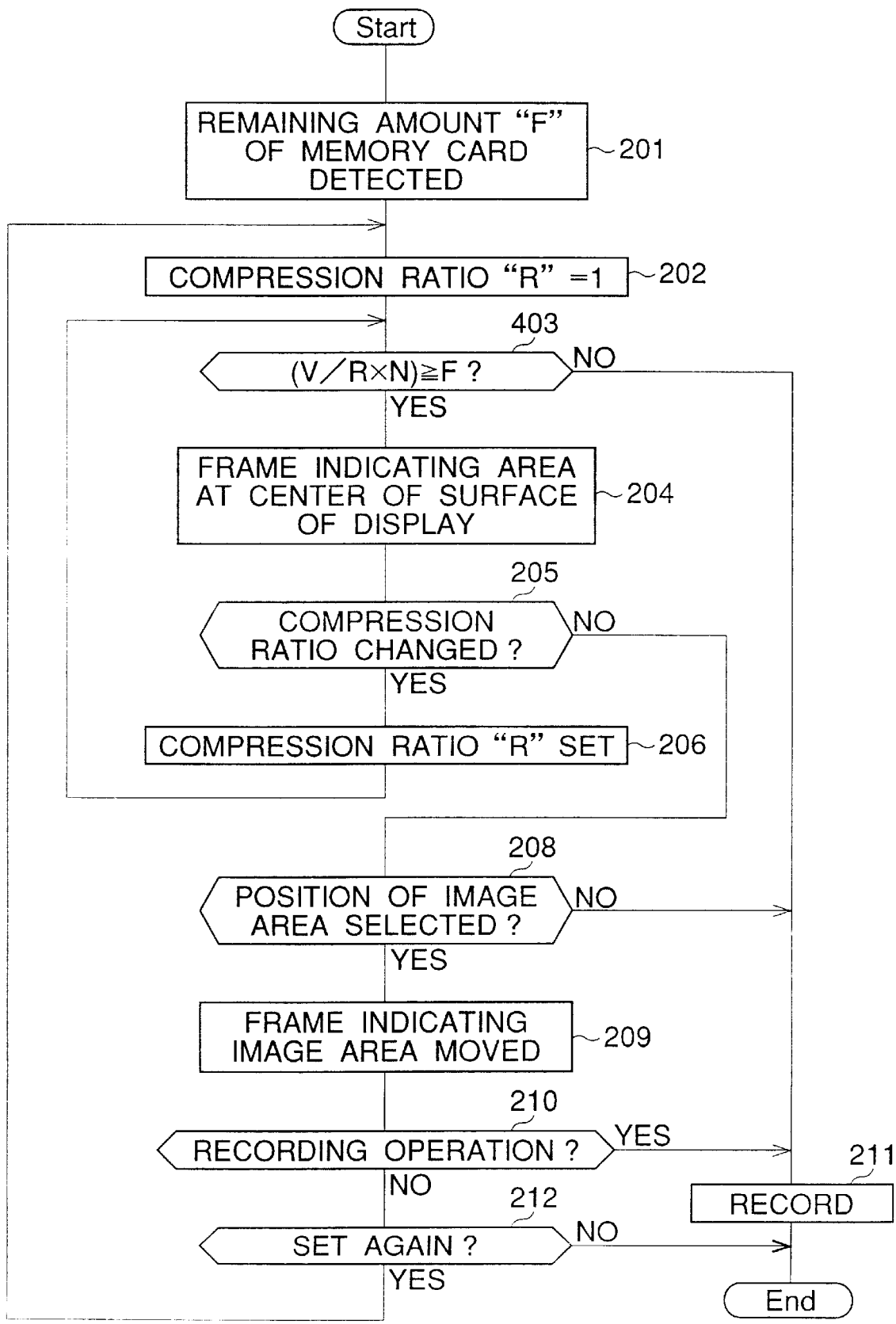
FIG. 4 is a second example of a flowchart of the program, by which an image signal is recorded in the memory card.

FIG. 4 is a second example of a flowchart of the program, by which an image signal is recorded in the memory card 17. A point different from the first example, shown in FIG. 2, is Step 403, the other Steps being the same. In Step 403, it is determined whether the compressed-image recording capacity ((V/R)×N), wherein "N" is a positive integer, necessary for recording image signals, which correspond to N number of images and are compressed with the compression ratio "R", is greater than or equal to the remaining amount "F" of the memory card 17. When the compressed-image recording capacity ((V/R)×N) is less than the remaining amount "F", Step 211 is executed, and when the compressed-image recording capacity ((V/R)×N) is greater than or equal to the remaining amount "F", Step 204 is executed. Note that "N" is set by an operation of the setting switch provided in the operation unit 21.

According to the recording operation shown in FIG. 4, even if the remaining amount "F" is less than the compressed-image recording capacity, which is necessary for recording the complete image signals compressed with the compression ratio "R", a part of each of (N+α) number of images, α being a positive integer, can be recorded in the memory card 17, respectively. Thus, an increase in efficient usage of the recording medium is realized.

Although the embodiments of the present invention have been described herein with reference to the accompanying drawings, obviously many modifications and changes may be made by those skilled in this art without departing from the scope of the invention.

The present disclosure relates to subject matter contained in Japanese Patent Application No. 9-108154 (filed on Apr. 10, 1997) which is expressly incorporated herein, by reference, in its entirety.

What is claimed is:

1. An image signal recording device comprising:
    a remaining amount detecting processor that detects a remaining amount of a recording medium, which is recordable;
    a recording processor that records only a part of a single image in the recording medium, when the remaining amount is less than a recording capacity necessary to record an image signal corresponding to the single image; and
    an indicating processor indicating an image area, corresponding to said part of the single image, on a surface of a display device.

2. An image signal recording device comprising:
    a remaining amount detecting processor that detects a remaining amount of a recording medium, which is recordable; and
    a recording processor that records only a part of a single image in the recording medium, when the remaining amount is less than a recording capacity necessary to record an image signal corresponding to the single image;
    wherein the part of the single image is recorded in a recording area having a size approximately equal to the remaining amount.

3. An image signal recording device according to claim 1, further comprising an image area selecting processor selecting said part of said single image based on an image area included in said single image.

4. An image signal recording device according to claim 1, further comprising a compression ratio setting processor setting a compression ratio of an image signal which is to be recorded in said recording medium, said recording processor recording said part of said single image in accordance with said compression ratio.

5. An image signal recording device according to claim 1, further comprising a comparing processor comparing said recording capacity with said remaining amount.

6. An image signal recording device according to claim 1, wherein said recording processor records said image signal in said recording medium without compressing said image signal, when said recording capacity is less than or equal to said remaining amount.

7. An image signal recording device according to claim 1, wherein said recording processor divides said remaining amount into a plurality of uniform recording areas and records said part of said single image in one of said plurality of uniform recording areas.

8. An image signal recording device comprising:
    a remaining amount detecting processor that detects a remaining amount of a recording medium, which is recordable;
    a compression ratio setting processor that sets a compression ratio of an image signal which is to be recorded in the recording medium; and
    a recording processor that records only a part of each of (N+α) number of images in the recording medium, when the remaining amount is less than a recording capacity necessary to record image signals, which correspond to N number of images and are compressed in accordance with the compression ratio, each of N and α a positive integer;
    wherein the parts of the images are recorded in a recording area having a size approximately equal to the remaining amount.

9. An image signal recording device according to claim 2, further comprising an image area selecting processor selecting the part of the single image based on an image area included in the single image.

10. An image signal recording device according to claim 2, further comprising a compression ratio setting processor setting a compression ratio of an image signal which is to be recorded in the recording medium, the recording processor recording the part of the single image in accordance with the compression ratio.

11. An image signal recording device according to claim 2, further comprising a comparing processor comparing the recording capacity with the remaining amount.

12. An image signal recording device according to claim 2, wherein the recording processor records the image signal in the recording medium without compressing the image signal, when the recording capacity is less than or equal to the remaining amount.

13. An image signal recording device according to claim 2, wherein the recording processor divides the remaining amount into a plurality of uniform recording areas and records the part of the single image in one of the plurality of uniform recording areas.

* * * * *